United States Patent [19]

Struthers

[11] Patent Number: 4,684,581

[45] Date of Patent: Aug. 4, 1987

[54] HYDROGEN DIFFUSION FUEL CELL

[76] Inventor: Ralph C. Struthers, 39503 Calle El Fuente, Saugas, Calif. 91350

[21] Appl. No.: 884,189

[22] Filed: Jul. 10, 1986

[51] Int. Cl.[4] ............................................. H01M 8/06
[52] U.S. Cl. ...................................... 429/19; 429/33; 429/34; 429/17
[58] Field of Search ...................... 429/19, 20, 33, 34, 429/30, 46, 17, 12

[56] References Cited

U.S. PATENT DOCUMENTS

| 2,824,620 | 2/1958 | De Rosset | 55/16 |
| 4,317,863 | 3/1982 | Struthers | 429/19 |
| 4,620,914 | 11/1986 | Abens et al. | 429/17 X |

OTHER PUBLICATIONS

The Diffusion of Hydrogen through Metals by H. G. Deming and Clifford Hendrick: in The American Chemical Society Journal 45;2857–64 (1923).

Primary Examiner—Anthony Skapars
Attorney, Agent, or Firm—Georges A. Maxwell

[57] ABSTRACT

An elongate fuel cell with anode and cathode chambers. A fuel supply delivers a hot fuel gas mixture of steam and methanol or methane to the anode chamber. A catalytic reformer in the anode chamber reforms the fuel gas to hydrogen and carbon dioxide. A hydrogen-permeable anode in the anode chamber is premeated by and diffuses the hydrogen to hydrogen ions and free electrons. A catalytic cathode in the cathode chamber receives hydrogen ions from the anode and is supplied with oxygen from the air. A di-electric, hydrogen-ion-permeable separator is positioned between the anode and the cathode to stop movement of electrons and permit movement of hydrogen ions therebetween. An external electric circuit is connected with and extends between the anode and cathode and conducts the free electrons from the anode to the cathode. The hydrogen ions, oxygen and electrons in the cathode react to produce the by-products, heat and water.

20 Claims, 4 Drawing Figures

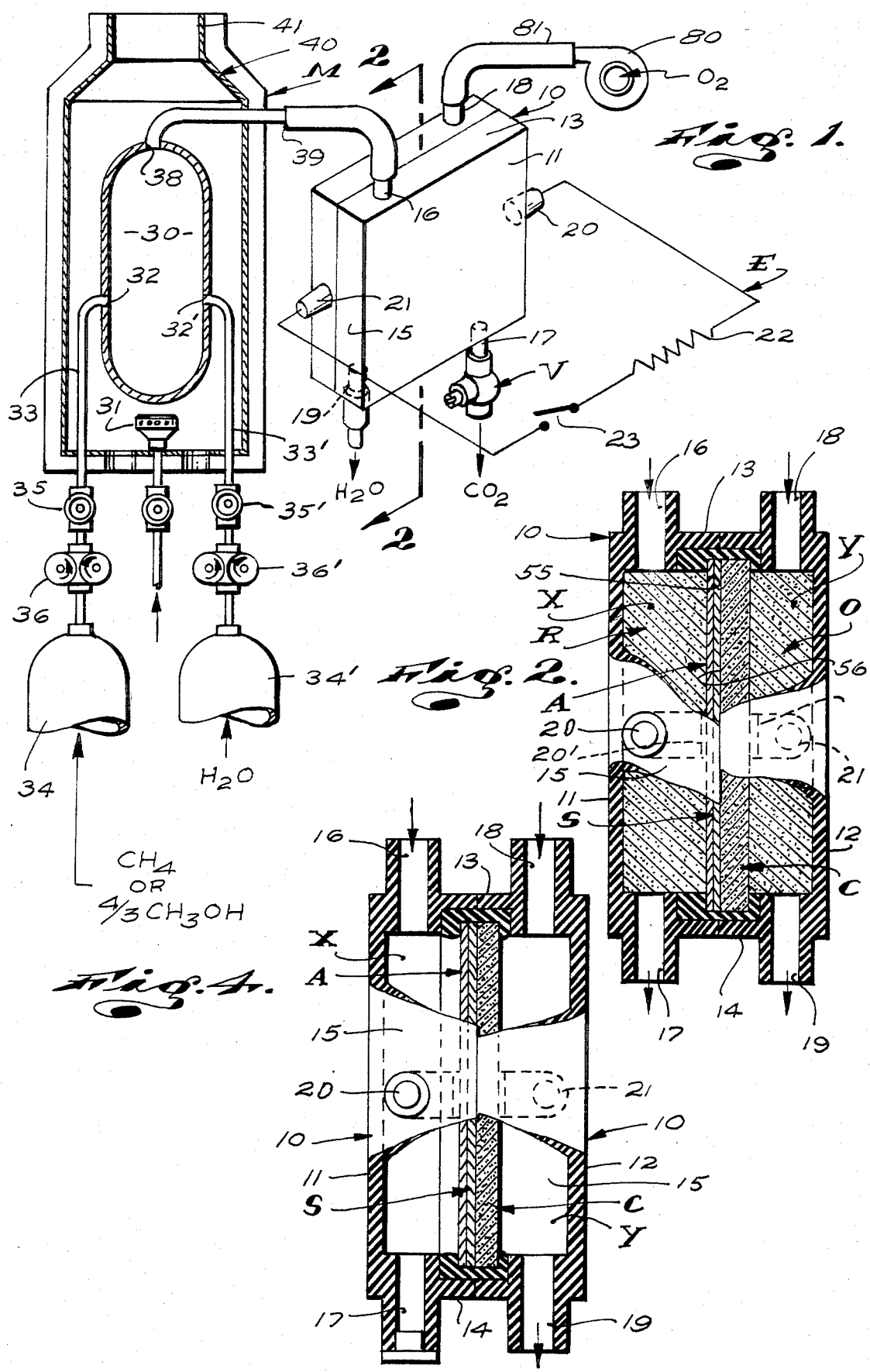

Fig. 3.

Reformer #1. (CH$_4$):

$$CH_4 + 2H_2O \longrightarrow CO_2\uparrow + 4H_2$$

Reformer #2. (CH$_3$OH):

$$\tfrac{4}{3}CH_3OH + \tfrac{4}{3}H_2O \longrightarrow \tfrac{4}{3}CO_2\uparrow + 4H_2$$

Anode:

$$4H_2 \longrightarrow 8H^+ + 8e^-$$

Cathode:

$$2O_2 + 8H^+ + 8e^- \longrightarrow 4H_2O\uparrow$$

Cell Net:

$$4H_2 + 2O_2 \longrightarrow 4H_2O\uparrow$$

HYDROGEN DIFFUSION FUEL CELL

BACKGROUND OF THE INVENTION

It has long been recognized that hydrogen is an extremely energetic element and an excellent fuel to fuel electro-chemical, electric power generating fuel cells.

The prior art has long sought to provide a simple, highly effective and efficient hydrogen-fueled fuel cell structure that is such that is has practical utility and such that it lends itself to commercial exploitation and economical usage. The prior art has failed to provide such a fuel cell as is evidenced by the unavailability and/or the absence of any such cell in industry and in the marketplace.

The reasons for the failure of the prior art to provide a hydrogen-fueled fuel cell of practical utility are manifold and are sufficiently well-known to those skilled in the art so that all reasons need not be enumerated. One notable reason such a fuel cell has not been provided by the prior art resides in the fact that the use of gaseous fuels in fuel cells, as a general rule, presents a multitude of structural problems which, prior to my invention, have prevented the establishment of such a cell which is sufficiently small, compact and/or sufficiently strong and durable for common everyday usage. Another notable reason such a fuel cell has not been provided by the prior art resides in the fact that substantially pure hydrogen gas must be used (for numerous reasons) and the fact that pure hydrogen gas is costly and complicated to produce, store, handle and dispense.

It has long been common practice to easily and economically produce impure hydrogen-enriched gas by what is commonly called Steam-Methane Reforming or Steam-Methanol Reforming methods and processes wherein hot vaporous or gaseous mixtures of steam (water) and either methane or methanol are moved into contact with a heated reformer catalyst, such as a porous nickel body in which they react and are reduced to a mixture of hydrogen and carbon dioxide gases. While the gaseous mixtures thus produced find many uses, they are, due to the carbon dioxide and other impurities, unsuitable for use in fuel cells.

To separate the hydrogen from the above noted hydrogen-enriched gaseous mixtures, it must be and often is subjected to other and separate processes.

It has long been recognized that most metals, in imperforate, non-porous form, can be permeated by hydrogen and that when hydrogen permeates them, the gas diffuses, or is reduced to hydrogen ions and free electrons. The hydrogen ions and free electrons, moving from said hydrogen-permeable metals, recombine to establish pure hydrogen gas. Thus, such hydrogen-permeable metals are, in effect, and are commonly used as "Separator Filters" to separate hydrogen gas from hydrogen-enriched feed gas mixtures, to produce pure hydrogen.

The hydrogen permeability of different metals varies widely. Accordingly, when seeking to separate and purify hydrogen from hydrogen-enriched feed gas mixtures, it is prudent to select a hydrogen-permeable metal or metal alloy which is highly permeable and which otherwise has those physical characteristics which will enable its practical use.

The permeability of hydrogen through a hydrogen-permeable metal membrane, layer, lamina or strata, as hydrogen ions is dependent upon several factors. The most important factors are the thickness of the metal membrane or strata, the pressure differential between the upstream or supply-side of the strata, which must be the high pressure side, and the downstream or discharge side of the strata which is the low pressure side, and the temperature of the metal strata. As a general rule, the rate of permeability is inversely proportional to the thickness of the metal strata. Thus, for greatest effectiveness and for certain other reasons, such as size, cost, and weight, such a metal strata should be made as thin as is possible and/or practical. Elevating the temperature of such hydrogen-permeable metal strata, as a general rule, expands the metals and opens the crystalline lattice structure thereof to appreciably enhance the permeability thereof. The temperatures to which different hydrogen-permeable metals can be safely elevated and the effects heating of such metals has on their permeability varies and is a factor to consider when selecting such a metal for such use. The pressure differential between the high pressure upstream side and the low pressure or downstream side of hydrogen-permeable strata used to separate and purify hydrogen from gas mixtures is believed self-evident, that is, it clearly and obviously induces and accelerates the rate of permeation of hydrogen through the strata.

I have found that a membrane or strata of hydrogen-permeable palladium or palladium-silver alloy, which has a high rate of hydrogen-permeability, can be effectively made as thin as 0.0005 inches, heated to temperatures in excess of 800° F. and, if suitably supported, can be effectively and safely subjected to pressure differentials in excess of 700 p.s.i. Such a hydrogen-permeable metal strata is particularly satisfactory for use in practicing my invention, as will hereinafter be described.

For a more comprehensive explanation and better understanding of hydrogen-permeable metal membranes or strata and their use in separating and purifying hydrogen from hydrogen-enriched mixtures of feed gas, reference is made to U.S. Pat. No. 2,824,620 issued to A. J. De Rosset on Feb. 25, 1958 and entitled Purification of Hydrogen Utilizing Hydrogen-Permeable Membranes.

OBJECTS AND FEATURES OF THE INVENTION

It is an object of my invention to provide a novel fuel cell structure that operates to receive a hydrogen-enriched feed gas; separates the hydrogen from the feed gas and changes it to hydrogen ions and free electrons; selectively transfers the hydrogen ions to react with an oxidant gas, such as oxygen; conducts said free electrons from the cell structure to perform useful work; and, which receives free electrons from the circuit to join with the hydrogen ions and oxidant gas to support fuel cell reaction.

It is an object and a feature of the invention to provide a fuel cell of the general character referred to above that includes a thin anode membrane or strata of hydrogen-permeable metal into which hydrogen in the fuel cell structure permeates, is diffused therein to hydrogen ions and free electrons, from which the hydrogen ions move and are used to support fuel cell reaction and from which the free electrons are conducted to perform useful work and thereafter support fuel cell reaction.

Yet another object and feature of my invention is to provide a fuel cell structure of the general character referred to above that includes a reformer of suitable catalytic material to which a heated feed gas mixture of steam and methane or methanol is fed and which reforms said feed gas to carbon dioxide waste gas and to hydrogen gas for use in operation of the fuel cell.

Still another object and feature of the invention is to provide a novel fuel cell structure of the general character referred to above that includes a cathode part that receives the hydrogen ions from the anode strata, oxygen (from the air) and free electrons (from the circuit) to establish fuel cell reaction and that includes a novel hydrogen-ion-permeable, di-electric separator part between the anode strata and the cathode part to stop movement of free electrons from the anode strata to the cathode part and effect movement of hydrogen ions from the anode strata to the cathode part.

Another object and feature of my invention is to provide a fuel cell of the general character referred to above that lends itself to being made small, compact, conservative of costly materials, and exceedingly durable and strong.

Finally, it is an object and feature of my invention to provide a fuel cell structure of the general character referred to above that can be easily, conveniently and economically operated on methane or methanol (which are inexpensive and in abundant supply), water, and oxygen from the air (which are most abundant at substantially no cost).

The foregoing and other objects and features of my invention will be apparent and will be fully understood from the following detailed description of typical, preferred embodiments of my invention throughout which description reference is made to the accompanying drawing.

DESCRIPTION OF THE DRAWINGS

FIG. 1 is an isometric view of a fuel cell embodying my invention with support means related to it;

FIG. 2 is a sectional view taken substantially as indicated by line 2—2 on FIG. 1;

FIG. 3 is the chemical formula that describes the operation of my fuel cell; and, FIG. 4 is a view similar to FIG. 2 and shows another embodiment of my invention.

DETAILED DESCRIPTION OF THE INVENTION

Referring to FIGS. 1 and 2 of the drawings, my new fuel cell structure includes an elongate case 10 established of a suitable high temperature resistant, di-electric material. If mass produced, the case 10 could be advantageously made of a suitable ceramic material.

The case 10 is a box-like structure with substantially square, longitudinally-spaced anode and cathode end walls 11 and 12 and top, bottom and side walls 13, 14 and 15, extending between the end walls 11 and 12.

The case might be advantageously made of two like opposing half sections welded or otherwise joined together when the fuel cell is assembled.

The opposite end portions of the case define anode and cathode chambers X and Y. The top and bottom walls have feed gas inlet and waste outlet ports 16 and 17 communicating with the chamber X and oxygen (air) inlet and bi-product outlet ports 18 and 19 communicating with the chamber Y. The several ports perferably include hose or line coupling nipples, as shown.

Finally, the case 10 has terminal post openings suitably positioned in its side walls 15 and in which anode and cathode terminal posts 20 and 21 are suitably sealingly engaged. The post 20 and 21 have inner portions to connect with anode and cathode parts and have outer ends that are connected with an external electric circuit E.

The circuit E can vary widely in form and is shown as including a resistance (work) 22 and an on and off switch 23.

Shown related to the fuel cell is a fuel supply means M. The means M is provided to supply feed gas to the fuel cell and includes a high pressure heater tank 30 above a burner 31. The burner can be fueled with methane, methanol or any other suitable fuel one might elect to use. Any other form of prime heating means might be used.

The heater tank has a feed fuel inlet opening 32 connected with a fuel line 33 that extends to a feed fuel tank 34 or other suitable supply means. The feed fuel is methane or methanol. The line 33 has a metering valve 35 and/or a variable delivery pump 36 engaged in it to effect controlled delivery of the feed fuel into the tank in desired volume and at desired elevated pressures of, for example, between 500 and 1,000 p.s.i.

The tank next includes a water inlet opening 32' connected with a water supply (tank) 34' by a line 33' in which a valve 35' and a pump 36' are engaged; to deliver water to the tank 30 in desired volume and at an elevated presure substantially equal to the pressure of the feed fuel.

Finally, the tank 30 has a feed gas outlet opening 38 connected with the port 16 by a line 39 to deliver a desired hot, high pressure feed gas (or vapor) mixture into the chamber X.

The means M next includes an adjustable pressure relief valve V at the outlet port 17 which, as will be apparent, serves to create a back pressure and/or maintains a desired operating pressure within the fuel cell.

The tank 30 and burner 31 can, as shown, be positioned within a suitable housing 40, with an exhaust fleu 41, in accordance with common practice and as required for efficient operation of the means M.

The fuel cell next includes a porous metal feed gas catalytic reforming reactor part R positioned in the chamber X. The part R is preferably a flat, plate-like part that substantially, fully occupies the chamber X. The part R is a porous, foamed or sintered metal part through which vapors and gases can freely move. The part R serves as a reformer catalyst, a gas distributor, an electron collector and as a support structure.

In practice, the part R has been made of sintered nickel, but can be made of other metals and alloys. For example, nickel alloyed with up to 10% Aluminum, Cobalt, Manganese, Chromium, Magnesium and/or Cerium would be quite suitable and effective.

The principal function of the part R is as a catalyst for reforming the hot feed gas delivered to the fuel cell from the means M into a mixture of hydrogen and carbon dioxide gas. Accordingly, substantially any catalytic material or compound which would serve that end might be used to establish the part R. Such materials that do exist can, therefore, be considered mechanical equivalents of nickel or nickel alloys such as I have noted above.

The fuel cell next includes a substantially flat, plate-like, gas-conducting, electron-distributing support part O within and occupying the end portion of the chamber Y adjacent to the end wall 12 of the case and with which the inlet and outlet ports 18 and 19 communicate.

It is to be particularly noted that the part O is included in my disclosed embodiment of the invention as a necessary structural support for the yet to be described cathode part C included in the fuel cell structure. The part C is a part that must be suitably spaced from the end wall 12 to provide space in the chamber Y to allow for the conducting of gases to it and the flow of waste by-products from it. Due to the high differentials of pressure between the chambers X and Y that result in high forces applied to the part C, I have found it prudent, if not necessary, to include the part O.

The part O can vary widely in construction and in the preferred carrying out of the invention is an extremely porous, structurally strong and stable, plate-like part of foamed or sintered metal, such as nickel or nickel alloy or a similarly formed ceramic or "plastic" material which is stable in its intended environment. It is such that fluids flow substantially freely through it.

The thickness of the part O depends, in part, upon its porosity. In practice I have found that a "course" sintered nickel alloy plate $\frac{1}{4}$ inch thick is satisfactory. Available information and figures indicate that a plate of foamed nickel $\frac{1}{8}$ inch thick, affording equal or greater flow, might be employed with equal success.

The fuel cell next includes the above referred to cathode part C. The part C is a flat, plate-like body of porous, electric-conducting, catalytic material into which hydrogen ions, oxygen and free electrons freely move and in which fuel cell reaction takes place, between said ions, oxygen and electrons. The by-products of that reaction are heat and water. The water in in the form of super heated steam.

The cathode part C is preferably made of a nickel alloy, including $90+\%$ nickel and $-10\%$ silver. Other nickel alloys containing Palladium, Platinum, Cobolt, Selenium, Tellurium, and other selected elements, would obviously prove to be satisfactory for establishing the part C.

The selection and use of a nickel or nickel alloy was dictated by my desire to provide a part C which is not only suitable as a catalyst to support fuel cell reaction, but a part that also provides a structurally sound, strong and stable part within the fuel cell structure.

The part C is positioned in the chamber Y inward (toward the central, vertical plane of the cell) in flat, uniform-supported engagement on and with a flat inner surface of the part O.

The parts R and C define and/or have flat, smooth (porous), opposing inner surfaces 55 and 56 which occur in close spaced relationship at the anode, or upstream, and cathode, or downstream, sides of the central, vertical plane of the fuel cell. The noted central "vertical plane" is that plane which defines and separates the anode and cathode end portions of the fuel cell structure and need not be dimensionally centered within the structure.

My new fuel cell next includes a non-porous, hydrogen-permeable anode strata or part A. The part A is a thin, flat, imperforate, non-porous part that is co-extensive with and occurs in flat uniform supporting engagement on and with the inner surface 55 of the part R.

The part A can be made of elements selected from Series 4, 5 and 6 of Group VIII of the Periodic Table of Elements. Those selected elements can be alloyed with elements selected from Series 4, 5 and 6 of Group IB of said Table of Elements. Preferred alloys of selected elements contain 60% to 80% Palladium (Pd) and 20% to 40% Silver (Ag).

From a study of the Table of Elements and by means of appropriate calculations, it is evident that other metals and alloys can be used to establish an effective, non-porous hydrogen-permeable anode part. Examples of such metals and metal alloys might include 0-80% of Titanium, Iron, Nickel and/or Cobalt and 0-40% of Copper and/or Silver.

The part A, while, in some respects, is the functional equivalent of an anode plate in ordinary or common fuel cells, it is structurally distinct in that it is so thin and fragile that it is non-self-supporting and does not constitute a "plate" in the normal structural sense or meaning of that term.

The part A is preferably but a fraction of 1 mil thick and can be applied to its adjacent supporting surface 55, or part R, in the form of a thin, metal foil, by electroplating, vapor deposition or any other suitable method and/or process that one might find appropriate and elect to employ. In accordance with the foregoing, the part A can best be defined as a mere layer, or "strata."

As previously noted in the preamble of this disclosure, the hydrogen-permeable part A is such that hydrogen is absorbed by or permeates it and is diffused or reduced within it to hydrogen ions (H+) and free electrons (e−).

Also, as previously noted, the permeability of and rate of permeation into and through part A is enhanced and is induced by heating the part and by establishing a pressure differential across it, from its high pressure upstream side (disposed toward part R) and its low pressure, downstream side (disposed toward the part C).

Again, reference can be made to the above identified U.S. Pat. No. 2,824,620 for more detailed description and a clear understanding of the nature and function of the part A, with the exception that the electrons and hydrogenions are removed and put to separate use as in the present invention.

Finally, my new fuel cell includes a thin, flat, non-porous, di-electric, hydrogen ion transfer separator part S between and in intersupporting engagement with the inner surface 56 of part C and the opposing, inner surface defined by the part A. The part S can be provided in two different forms. In one form, it is a non-porous, di-electric, hydrogenion diffusion separator part while in its other form, it is a non-porous, di-electric, hydrogen ion perm-selective, solid-state electrolyte separator. In either form, it electrically insulates part A from part C to prevent dead short-circuiting of the fuel cell while allowing or providing for the movement or transfer of hydrogen ions from part A to part C.

Like part A, part C is preferably made as thin as is possible and in practice need only be a fraction of 1 mil in thickness.

In its diffusion separator form, the part S is made of Germanium, though it can be made of or be alloyed with Tellurium and/or Selenium.

In its hydrogen ion, perm-selective electrolyte form, the part S can be established of an ionic compound in accordance with or which falls within the generic formula:

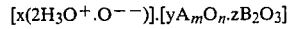

$$[x(2H_3O^+.O^{--})].[yA_mO_n.zB_2O_3]$$

Where A is selected from element group lithium, beryllium, sodium, manganesium, calcium and/or germanium; and B is from group boron, aluminum, gallium scandium and/or uttrium. X and Y range from 0.1 to 3 and Z from 5 to 20. M and N represent indeces corresponding to the stoichiometry of the constituents in a given group $A_mO_n$; and O represents oxygen, $H_3O^+$ hydrogens ions and $O^{--}$ oxygen ions.

My perm-selective electrolyte can be:

$$(2H_3O^+.OO^{--}).BeO.10Al_2O_3).$$

The part S can be established in the form of a thin, non-porous sheet or film and applied to its related supporting surface of either part A or part C during assembly of the fuel cell or can be applied to either of said supporting surfaces by electroplating, vapor-deposition, slurry deposition, or any other suitable method and/or process one might find suitable and elect to employ.

It is important to note that the end walls 11 and 12 and parts R, O and C are strong, self-supporting structures and that parts A and S are, though made of durable materials, rendered non-self-supporting and fragile by their thin state. However, the noted several walls and parts 11, R, A, S, C, O and 12 are arranged in stacked, inter-supporting relationship to establish an integrated, laminated unit structure which, as a whole, is extremely compact, strong and durable. The fragile parts A and S are held securely captive and are incapable or unlikely to be physically damaged by forces encountered during normal operation and use of the fuel cell.

In the form of my invention shown, the inner ends of the terminal posts 20 and 21 are electrically connected to their related anode and cathode parts A and C by conductor straps 20' and 21', as shown in FIG. 2 of the drawings. The straps 20' and 21' can be formed and made to extend across the parts A and S to be effective electron collectors and distributors without adversely effecting desired and intended functioning of the fuel cell.

In addition to the foregoing and to assure the continuous flow of air into the chamber Y and through the part O to supply oxygen to the part C and to assure the continuous movement of by-product steam ($H_2O$) from the part C and out of the chamber Y, I have shown an air pump 80 connected with the inlet port 18 by line 81. The pump 80 assures the continuous flow of air or oxygen into the chamber Y to feed the part C and serves to move and displace the by-product steam out through the outlet port 19.

OPERATION OF THE FUEL CELL

When my new fuel cell is to be put into operation and use, the means M is first put into operation to generate and deliver into the chamber Y a super-heated supply of feed gas consisting of a mixture of steam ($H_2O$) and methane gas ($CH_4$) or methanol vapor ($4/3CH_3OH$), at high pressure. The feed gas is preferably and/or, for example, delivered into the chamber X at about 800° F. and at about 700 p.s.i. Such elevated temperatures and pressure of and on the gas are attained within the heater tank 30. A continuous supply of the feed gas to and through the chamber X is sustained by means of the pumps 36 and 36' that deliver fuel and water into the tank 30 and by the pressure relief valve V related to the outlet port 17 of the chamber X.

The feed gas heats the reformer reactor part R to a temperature where reforming of the feed gas to hydrogen ($4H_2$) and carbon dioxide ($CO_2$) commences and continues. This can be observed to be taking place by observing the flow of carbon dioxide and hydrogen from the downstream side or end of the outlet port 17 and/or valve V.

When the noted reformation of the feed gas commences, the part A and the remainder of the fuel cell is at effective elevated operating temperature and the external circuit E is closed (if not previously closed), whereupon fuel cell operation commences. During such operation, the hydrogen gas in the chamber X (distributed by part R) permeates part A and is diffused or reduced to hydrogen ions ($8H^+$) and free electrons ($8e^-$). The free electrons are collected and conducted through the circuit E to perform useful work. The hydrogen ions move from part A to part S and thence into part C where they react with the oxygen ($2O_2$) delivered to part C and with free electrons ($8e^-$) delivered to part C by the circuit E. The by-product of the reaction in part C is heat and water ($4H_2O$). The heat serves to further heat the fuel cell structure to still higher and more effective operating temperatures, for example, to temperatures close to or in excess of 1,000° F. where reforming of the feed gas is more effective and efficient and where permeability of the parts A and S is greater.

In practice, the heat product of fuel cell reaction is sufficiently great so that it can be used to pre-heat the fuel and water supply for the means M and/or to supplement the burner 31 of the means M, as desired. The structural means one might use to put the by-products re-use are numerous and are believed to be so apparent as not to require further discussion or description. Since any such means one might employ would be but a supplemental means and not a necessary means or part of my invention, I have elected not to unnecessarily burden this disclosure with a detailed disclosure of such a means.

In FIG. 3 of the drawings, the formula which describes the function and/or operation of my new fuel cell is presented.

In practice, if a suitable supply of hydrogen gas is available and reformation of feed gas, as noted above, is not required, the part S is not required. Further, if the part C is made sufficiently thick and strong, the part O can be eliminated.

In FIG. 4 of the drawings, I have shown an embodiment of my invention wherein the parts R and C are eliminated and which is suitable to be fueled by and operated on a supply of hydrogen from an external, or independent, source or supply.

Having described only typical prefered embodiments of my invention, I do not wish to be limited to the specific details herein set forth but wish to reserve to myself any modifications and variations that might appear to those skilled in the art and which fall within the scope of the following claims:

Having described my invention I claim:

1. A fuel cell comprising; an elongate case; a thin, flat separator part of non-porous, di-electric, hydrogen-permeable material between the ends of and extending transverse the case and defining anode and cathode chambers therein; a thin, flat anode part of non-porous, electric conductive, hydrogen-permeable metalic material in the anode chamber in flat contacting engagement with and co-extensive with said separator part; a flat, porous, catalytic cathode part in the cathode chamber in contacting engagement with the separator part; hydrogen supply means supplying hydrogen to said anode part within the anode chamber; oxidant gas supply means supplying oxidant gas to the cathode part within the cathode chamber; and, an external electric circuit connected with and between the anode and cathode parts; said anode part absorbs and is permeated by hydrogen supplied to it and diffuses the hydrogen to hydrogen ions and free electrons; the free electrons in the anode part are conducted from the anode part into the electric circuit to perform useful work; the hydrogen ions in the anode part move from the anode part through the separator part and into the cathode part; free electrons are conducted by the electric circuit into the cathode part; the hydrogen ions, oxidant gas and free electrons in the cathode part react and generate waste, heat and water.

2. The fuel cell set forth in claim 1 wherein the anode part is heated to increase its permeability and the rate of hydrogen diffusion therein.

3. The fuel cell set forth in claim 1 wherein the anode and separator parts are heated to increase their permeability and the rate of hydrogen diffusion and rate of movement of hydrogen ions therein.

4. The fuel cell set forth in claim 1 wherein hydrogen is supplied to the anode part at greater pressure than the pressure within the cathode part and creates a pressure differential across the anode and separator parts that induces movement of hydrogen ions from the anode part through the separator part and into the cathode part.

5. The fuel cell set forth in claim 1 wherein hydrogen is supplied to the anode part at greater pressure than the pressure within the cathode part and creates a pressure differential across the anode and separator parts that induces movement of hydrogen ions from the anode part through the separator part and into the cathode part, the anode part is heated to increase its permeability and the rate of hydrogen diffusion therein.

6. The fuel cell set forth in claim 1 wherein hydrogen is supplied to the anode part at greater pressure than the pressure within the cathode part and creates a pressure differential across the anode and separator parts that induces movement of hydrogen ions from the anode part through the separator part and into the cathode part, the anode part and separator part are heated to increase their permeability and the rate of hydrogen diffusion and rate of movement of hydrogen ions therein.

7. The fuel cell set forth in claim 1 wherein the hydrogen supply means includes a water supply, a methane supply, a heater heating water and methane into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste.

8. The fuel cell set forth in claim 1 wherein the hydrogen supply means includes a water supply, a methanol supply, a heater heating water and methanol into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste.

9. The fuel cell set forth in claim 1 wherein the hydrogen supply means includes a water supply, a methane supply, a heater heating water and methane into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, the anode part is heated to increase its permeability and the rate of hydrogen diffusion therein.

10. The fuel cell set forth in claim 1 wherein the hydrogen supply means includes a water supply, a methanol supply, a heater heating water and methanol into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, the anode part and separator part are heated to increase their permeability and the rate of hydrogen diffusion and rate of movement of hydrogen ions therein.

11. The fuel cell set forth in claim 1 wherein the hydrogen supply means includes a water supply, a methane supply, a heater heating water and methane into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, hydrogen is supplied to the anode part at greater pressure than the pressure within the cathode part and creates a pressure differential across the anode and separator parts that induces movement of hydrogen ions from the anode part through the separator part and into the cathode part.

12. The fuel cell set forth in claim 1 wherein the hydrogen supply means includes a water supply, a methanol supply, a heater heating water and methanol into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, hydrogen is supplied to the anode part at greater pressure than the pressure within the cathode part and creates a pressure differential across the anode and separator parts that induces movement of hydrogen ions from the anode part through the separator part and into the cathode part.

13. The fuel cell set forth in claim 1 wherein the hydrogen supply means includes a water supply, a methane supply, a heater heating water and methane into a super-heated fuel gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, the anode part is heated to increase its permeability and the rate of hydrogen diffusion therein, hydrogen is supplied to the anode part at greater pressure than the pressure within the cathode part and creates a pressure differential across the anode and separator parts that induces movement of hydrogen ions from the anode part through the separator part and into the cathode part.

14. The fuel cell set forth in claim 1 wherein the hydrogen supply means includes a water supply, a methanol supply, a heater heating water and methanol into a super-heated feed gas mixture, a conductor conducting the feed gas to the anode chamber, a porous, catalytic reformer part in the anode chamber receiving and in which the feed gas is reformed to hydrogen that permeates the anode part and carbon dioxide which is conducted to waste, the anode part and separator part are heated to increase their permeability and the rate of hydrogen diffusion and rate of movement of hydrogen ions therein, hydrogen is supplied to the anode part at greater pressure than the pressure within the cathode part and creates a pressure differential across the anode and separator parts that induces movement of hydrogen ions from the anode part through the separator part and into the cathode part.

15. The fuel cell set forth in claim 1 wherein the oxidant gas is oxygen and is supplied to the cathode part from air moved into and through the cathode chamber.

16. The fuel cell set forth in claim 1 wherein the anode part is made of elements selected from Series 4, 5, and 6 of Group VIII of the Periodic Table.

17. The fuel cell set forth in claim 1 wherein the anode part is made of elements selected from Series 4, 5, and 6 of Group VIII alloyed with elements selected from Series 4, 5 and 6 of Group B.

18. The fuel cell set forth in claim 1 wherein the seperator part is a hydrogen ion perm-selective solid-state electrolyte made of an ionic compound in accordance with the formula $[x(2H_3O^+.OO^{--})].[yA_mO_n.ZB_2O_3]$ as described.

19. The fuel cell set forth in claim 1 wherein the seperator part is a hydrogen ion perm-selective solid-state electrolyte made of an ionic compound in accordance with the formula $(2H_3O^+.OO^{--}).(BeO.10Al_2O_3)$.

20. The fuel cell set forth in claim 1 wherein the seperator part is made of elements selected from Series 2, 3, 4 and 5 of Groups IV A, V A, and VI A of the Periodic Table of Elements.

* * * * *